Figure 1:
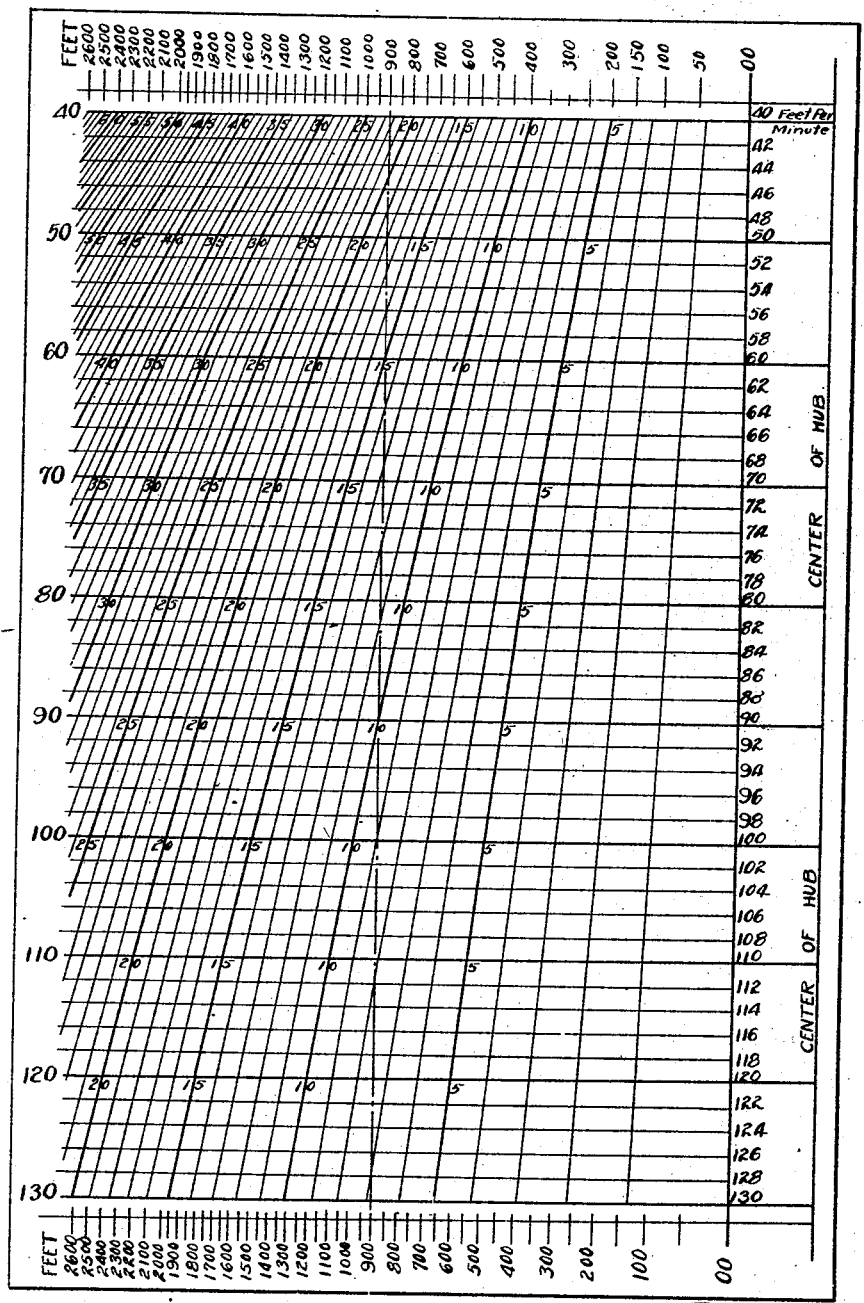

Dec. 8, 1925.  1,564,964
C. A. KNIELING
FILM MEASURING CHART
Filed Aug. 6, 1923    2 Sheets-Sheet 1

INVENTOR
Charles A. Knieling
BY Baker & Mocklin
ATTYS.

Dec. 8, 1925.

C. A. KNIELING

FILM MEASURING CHART

Filed Aug. 6, 1923

1,564,964

2 Sheets-Sheet 2

INVENTOR
Charles A. Knieling
BY Baker & Macklin
ATTYS.

Patented Dec. 8, 1925.

1,564,964

UNITED STATES PATENT OFFICE.

CHARLES A. KNIELING, OF CLEVELAND, OHIO.

FILM-MEASURING CHART.

Application filed August 6, 1923. Serial No. 655,863.

*To all whom it may concern:*

Be it known that I, CHARLES A. KNIELING, a citizen of the United States, residing at Cleveland, in the county of Cuyahoga and State of Ohio, have invented a certain new and useful Improvement in a Film-Measuring Chart, of which the following is a full, clear, and exact description, reference being had to the accompanying drawings.

This invention is concerned with the practical operation of moving picture theaters and is directed to improvements in the manner of formulating or making up the performance programme; and in the methods of enabling the operator to adhere to programme.

In operating moving picture machines, one of the difficult requirements which the operator has to meet is the ability to cooperate with the management in predetermining the time schedule of moving picture expositions. This is an essential requirement inasmuch as the efficient management of a moving picture theater requires the starting and finishing of the entire program within a fairly definite time period.

It frequently occurs in operating a moving picture machine that it is desirable to know the number of exposures per minute, (more commonly known as feet per minute) at which to operate the machine to complete the exposition of the film in a definite time. This is particularly true when films are being exhibited on a definite program for the first time and before the operator has had an opportunity to familiarize himself with the definite length of the film. In making up the program, it is also frequently desirable to have this information without necessitating rehearsal or preliminary running of the films.

Likewise, it frequently occurs that the operator is called upon to determine certain increases of speed in the projection machine whereby unforeseen delays due to breaks in the film, or trouble with the projection mechanism or lamp, or other causes may be compensated for, so as to complete the "show" in the allotted time to meet the time schedule of the orchestra, etc. Immediately upon the receipt of the reels of film from the exchange, the manager or operator usually estimates the approximate length of film or size of the "show" and thereby determines the number of "shows" to be given. The total length of film or rolls for one complete "show" which is to extend through a definite period, usually from one hour and fifteen minutes to two hours and fifteen minutes, depends upon the balance of the program. This approximation, however, has been based solely upon the judgment of the operator or manager, and since the rate of speed of projection of the picture may be standard within fairly close limits for a particular theater, the usual practice is to try to maintain a speed of say 80 feet per minute. A simple method therefore of accurately determining the foregoing factors is highly desirable. There are, also, theaters where a mixed program is the custom or where time for projecting pictures is definitely fixed for each "show" and the reels of film no matter of what length, must be run at such speed as to conform to this time schedule.

It will be seen that from the operator's standpoint, two or three factors enter into the efficient operation of a projection machine relative to the program, namely the allotted time for the projection of the entire picture regardless of the number of reels of film in the picture, the length of the film, that is the length of the film on the reels comprising the picture and the rate of speed of projection which is usually termed in feet per minute. If two of these factors are known the third can be determined. The rate of projection, however, may be varied, due to several causes, for instance, the program may be disarranged by certain pictures of the program consuming more than or less than the allotted time or by having been run over or under the proper speed.

The general object of the present invention therefore, is the provision of a timing system applicable in the moving picture industries for predetermining the time element in running or operating a film reel or for predetermining the number of exposures or projections required per minute to complete the exhibiting of the picture within a definite period for any given length of film.

My system also contemplates the provision and use of various means which may readily give this information and which is of such simple character that any ordinarily skilled operator may make efficient use thereof.

A further object of the present invention is the provision of a measuring chart having universal characteristics which will permit of its being used under a variety of conditions and which is provided with markings and indicia that give the user the desired information directly when used in accordance with my system.

Other objects will be hereinafter more fully set forth in the following description pertaining to the drawings and the essential characteristics are summarized in the claims.

Figures 2, 4:
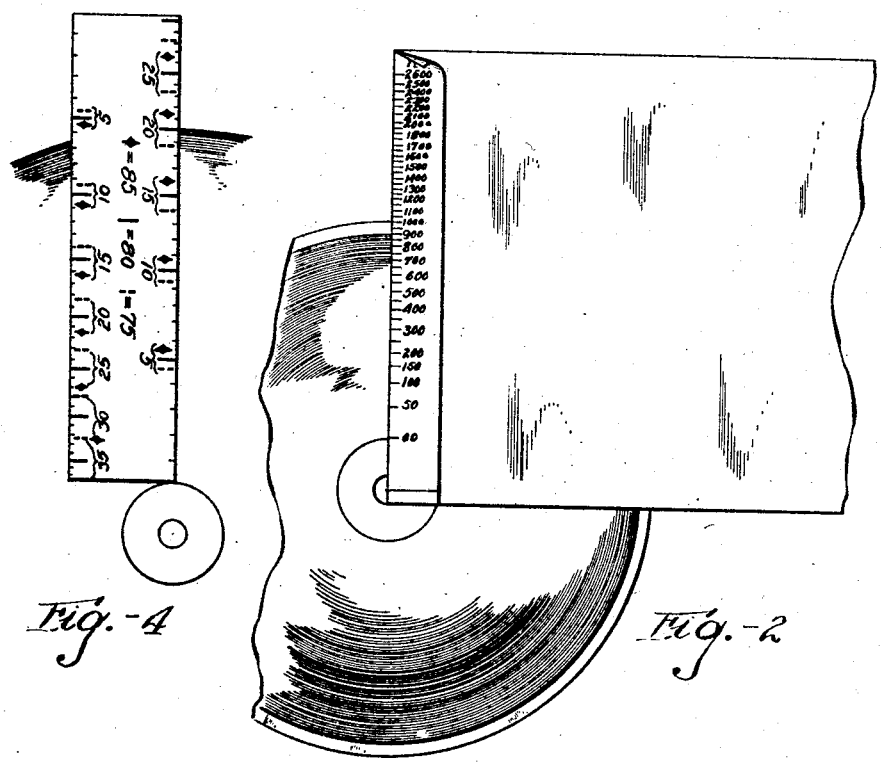
Figure 3:
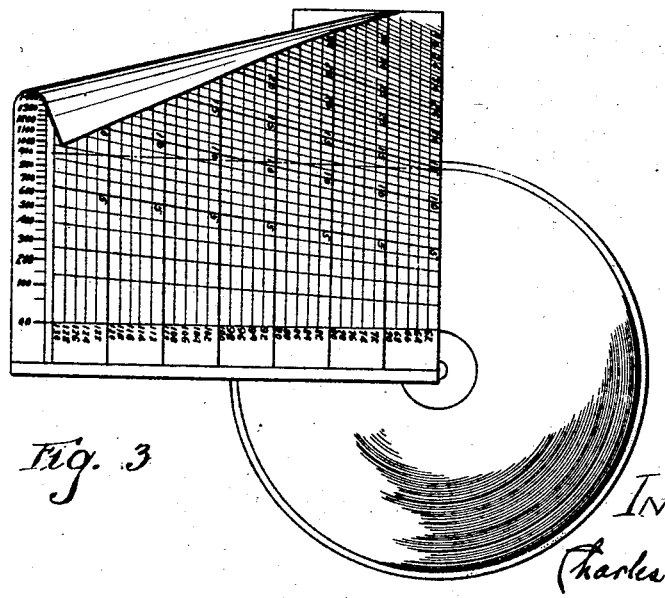

To simplify the explanation of my system, I show in Fig. 1 of the drawings, the plan development of a chart provided with a ruled surface, the rulings bearing certain relations as will be hereinafter explained. Fig. 2 illustrates the application of the chart in measuring a film reel when determining the total feet of film on the reel; Fig. 3 illustrates a similar use of the chart in determining the time element, which the particular film being measured bears relative to the total program being outlined or determined; Fig. 4 illustrates the use of a simplified embodiment of the charts, which may be used in my system.

The first step contemplated in the use of my system, therefore, is a fairly accurate determination of the length of film on the reels within practical limits. It is true that many operators develop some ability to estimate approximately the length of film on a part or whole reel. However, it is intended that my system will obviate depending upon the varying ability of the operator and I accordingly, first of all, simplify the laborious mathematical method of calculating the length of the film, which method, for this purpose, may be represented in graphical form on a chart such as is shown in Fig. 1.

The graduation of this chart may be determined by taking trial calculations of various empirical film thicknesses, the film being assumed to be continuous from a center line of a shaft of zero diameter and to have a number of convolutions of uniform thicknesses of film per inch throughout the radius of the film reel. In actual practice however, the film is packed more closely toward the center of the roll than toward the perimeter thereof; however calculations based upon the above assumption may be embodied in a practical graphical representation which will give a fairly accurate result regardless of this irregularity in reel density.

As an example of the above referred to calculations, a theoretical film having convolutions of an assumed thickness of $\frac{1}{4}''$ may first be calculated, the length of the circumference of each of the convolutions being calculated in the film of each layer being calculated in the usual mathematical manner and the summation of these circumferences will give certain constants. For instance, the length of a film having a theoretical thickness of $\frac{1}{4}''$ would be the sum of the circumferences calculated on the $\frac{1}{8}''$, $\frac{3}{8}''$, $\frac{5}{8}''$ and $\frac{7}{8}''$ etc. radii. The average number of layers of film thickness per inch of radius on a film roll is about 168, determined by the measuring of a large number of reels, thus, in using a $\frac{1}{4}''$ theoretical thickness for a series of calculations, the constant to be found for this set of calculations would be $\frac{1}{4} \times 168$ which equals 42. Further series of calculations may be thus made taking various theoretical thicknesses to obtain a series of constants and the resulting data graphically arranged as shown at the top and bottom margins of the chart set forth in Fig. 1.

In this chart, it will be noted that the right hand margin is spaced apart from the double zero line a certain distance, this distance corresponding to the radius of the reel hub. Horizontal lines are uniformly spaced apart, the distances therebetween corresponding to a variation of two feet per minute in the speed of the film while the intersecting curved lines correspond to minutes, the five minute interval being shown in heavier lines for convenience in reading. As hereinbefore stated, the top and bottom margins of the chart, are scales representing the integrations of length in feet, based on a radius measurement of the film reel as determined by the calculations herein set forth.

This scale may also be determined by adding together the circumference of the wheel hub, the outside circumference of the film roll; dividing the result by two thus gives the average length of all the layers of film on the roll. By subtracting $\frac{1}{2}$ of the diameter of the reel hub from $\frac{1}{2}$ the diameter of the film reel, we obtain the depth of the film roll in feet from the outside diameter of the reel to the hub. Hence by multiplying the number of inches of the depth in the film reel by 168 and then multiplying the result by the average length of the rolls and dividing the product by 12, thus reducing to feet, the total length of the film will be determined in feet.

The curved lines may be plotted by calculating the minutes required to run a given number feet of film at the rates of speed represented by the horizontal parallel lines. Thus, for example the points in five minute lines may be determined by multiplying the feet per minute by five and locating this value and distance on those horizontal lines corresponding to the rate of exposure, multiplied by five at distances from right margin which are equal to the distance indicated in feet on the top and bottom margin scales.

The projection time chart may be formed on a flexible sheet such as cloth or other fabric and may be used as follows: If it is desired to determine the number of minutes required to exhibit a film of unknown length, the film to be "run" at a definite number of feet per minute, taking for example, sixty feet per minute as shown in Fig. 3, the chart may be folded along the 60 line and placed adjacent the edge of the film roll, convolutions with the left hand marginal line coincident with the center of reel, and the total number of minutes required to exhibit the reel at this rate of speed may be read directly without reference to the length of film scale along the top and bottom margins of the chart. In the illustrations shown, the time element thus determined would be 15 minutes.

If it is desired to determine the rate of projection for the film, for instance in twelve minutes, the chart may be used to measure the total length of film as shown in Fig. 2 and a line parallel with the right hand margin line, Fig. 3 and projecting through the 900 foot indicia of the top and bottom film length scales, would intersect the twelve minute line at approximately the intersection of the twelve minute line and the seventy foot per minute line as indicated by the dot and dash lines in Fig. 1.

In Fig. 4, I illustrate a simplified means of determining the foregoing factors by the use of a scale provided with certain graduations, the scale being graduated according to the diameter of the hub of a particular make of film reel. The outer rows of figures opposite the brackets designate the minutes to "run." The dotted graduation corresponds to the projection speed of 75 feet per minute, and the full lines, 80 feet per minute, while the diamond-shaped marks correspond to a projection speed of 85 feet per minute, the right hand graduated edge of the scale being for a film reel having a hub of different diameter or for a different make of reel.

It is to be seen therefore, that I may provide a very simple scale of this character having the opposite faces thereof graduated for practical rates of projection, whereby the scale is adaptable for use on reels having four different hub diameters. Likewise, the utility of this scale could be increased by having additional intermediate graduations placed back from the edge of the scale, or, if desired, three edges of the scale may be graduated as a projection time scale while the fourth edge may be graduated as a length of film on a reel scale.

From the foregoing description, it is to be seen that I provide a system of extreme utility in the management of motion picture theaters, whereby the operator may definitely determine in advance of any projection of the pictures the various time elements or rates of projection required for the proper and efficient exhibition of a number of reels of picture films in co-ordination with the remainder of the theatrical program.

Having thus described my invention I claim:—

1. A scale for the purpose described comprising a rule member having distinctive series of graduations formed along the marginal edges thereof, each series corresponding to selected rates of film projection in feet per minute and which when directly compared to the depth of film on a reel as measured radially from the circumference of the hub to the outside circumference of the film on the reel indicates directly in minutes, the total time required to project the film on the reel at a selected rate of projection.

2. A chart for the purpose described comprising a flexible sheet having integrated scales on opposite margins representing length of film in feet, intermediate uniformly spaced lines corresponding to rates of film projection on feet per minute and curved lines extending between said margins and crossing said rate lines at proper points therein to designate the total time period in minutes for projecting a film of a given length at a given rate in feet per minute.

In testimony whereof, I hereunto affix my signature.

CHARLES A. KNIELING.